May 13, 1958  E. BAUMAN  2,834,879
FREQUENCY SELECTIVE SYSTEM
Filed Jan. 23, 1952  3 Sheets-Sheet 1
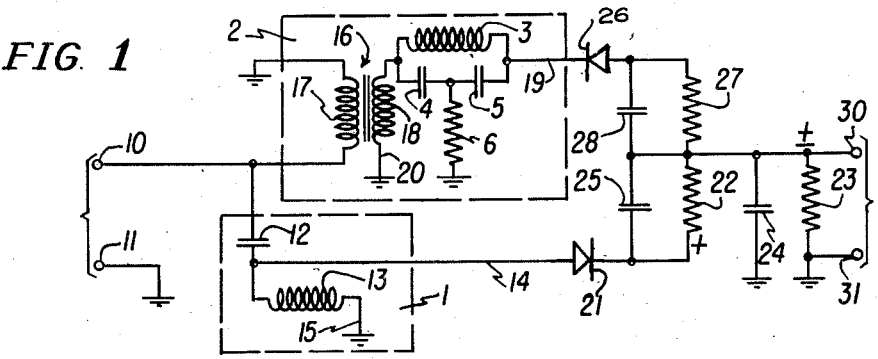
FIG. 1
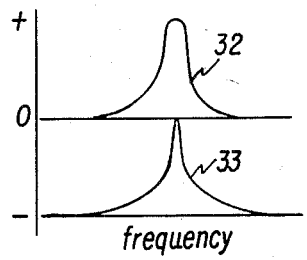
FIG. 2a
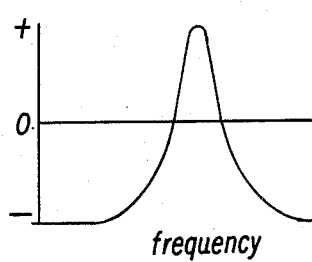
FIG. 2b
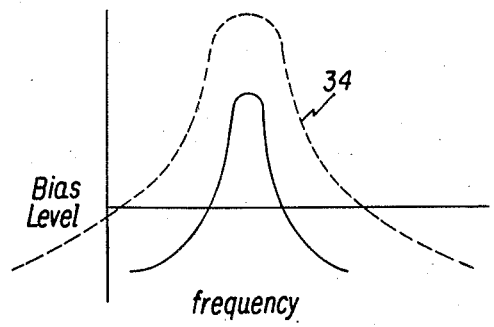
FIG. 2c
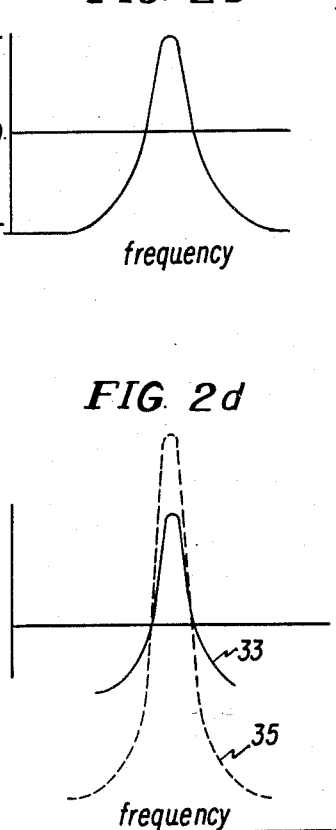
FIG. 2d
FIG. 2
INVENTOR.
Edward Bauman
BY
Foorman L. Mueller
Atty.

May 13, 1958 E. BAUMAN 2,834,879
FREQUENCY SELECTIVE SYSTEM
Filed Jan. 23, 1952 3 Sheets-Sheet 2

INVENTOR.
Edward Bauman
BY
Foorman L. Mueller
Atty.

May 13, 1958      E. BAUMAN      2,834,879

FREQUENCY SELECTIVE SYSTEM

Filed Jan. 23, 1952      3 Sheets-Sheet 3

INVENTOR.
Edward Bauman
BY
Foorman L. Mueller
Atty.

United States Patent Office 2,834,879
Patented May 13, 1958

2,834,879

FREQUENCY SELECTIVE SYSTEM

Edward Bauman, Chicago, Ill., assignor to Motorola, Inc., Chicago, Ill., a corporation of Illinois Application January 23, 1952, Serial No. 267,887

5 Claims. (Cl. 250—27)

The present invention relates to electric signal frequency selector systems, and more particularly to a detector circuit which responds to an electric signal of a single predetermined continuous frequency in the presence of a plurality of discontinuous electric signals of random mixed frequencies and variable amplitudes.

Development of radio and telephone communication has led to the use of selective calling or signal systems by means of which a selected receiving station or group of receiving stations included in a common network of stations may be notified and/or connected for communication with a sending station. The usual practice to selectively call a particular receiving station in the network is to transmit a series of identifying signals of certain selected frequencies or time durations, which will operate selector circuits of a particular receiving station to indicate the desired call or to automatically connect the station in the network for the call. In the case of radio communication systems the reception of the calling signal by the selector circuit of the radio receiver may be effective to connect the loudspeaker for reproduction of the communication. In order to simplify the equipment, the calling signals are usually provided in the audio frequency range and are transmitted at the beginning of each communication or transmission. The selection of the calling signal by the receiver selector circuit may be effective to operate a relay and relay holding circuit by means of which the loudspeaker or other enabling circuits of the receiver are activated for the remainder of the transmission period. At the end of the transmission period the holding circuit for the relay may be disconnected by any one of a number of arrangements, a particular description of which is not required for an understanding of the present invention.

The prior systems of the type described have been relatively complicated and expensive and, accordingly, have not been suitable for use in many applications. Further, in the selective calling systems of the frequency selective type, difficulty has been encountered in obtaining reliable operation when large numbers of receiving stations having closely similar calling signal frequencies are interconnected in a single communication network. A similar difficulty is encountered in obtaining reliable operation from the calling signal frequencies of varying amplitudes in the presence of interfering random mixed discontinuous frequency variable amplitude signals such as may be caused by electrical noise, voice frequencies, and the like. In view of these difficulties a selective calling system using a single tone or single frequency calling signal has not been satisfactorily reliable in operation because of difficulties in designing an electric frequency selector circuit or detector which would reliably respond to a selected single continuous frequency signal of variable amplitude during the signal interval in the presence of random mixed discontinuous frequencies of varying amplitudes. Prior to this invention the selectivity of a single signal frequency selecting circuit has not been high or uniform over varying amplitude ranges of signals at or near the selected frequency.

It is an object of the present invention to provide an electric signal frequency selector circuit particularly responsive to a single selected frequency in the audio frequency range and having very high selectivity.

Another object of the invention is to provide an electric signal frequency selector circuit having very high discrimination for selecting a single selected continuous frequency of variable amplitude in the presence of random mixed discontinuous frequencies of variable amplitudes.

A further object of the invention is to provide an electric signal frequency selector circuit having very high selectivity for a single selected frequency in the presence of other signal frequencies and noise, such as to enable the use of the selector circuit in a single tone selective communication system or the like.

Yet another object of the invention is to provide a highly selective single frequency signal selector circuit having uniform selectivity for varying amplitudes of signals at or near the selected frequency.

A feature of the invention is the provision of an electric signal frequency detecting circuit including a tuned resonant circuit for imparting to the signal of selected continuous frequency, a resonant amplitude normally greater than its original amplitude and the amplitudes of the random discontinuous non-resonant mixed-frequency signals, and for separately rectifying the resonant amplitude selected frequency signal and the non-resonant amplitude mixed frequency signals to produce direct current signals of opposite polarity, together with a circuit for differentially combining the rectified signals to produce momentarily a signal of one polarity responding to the selected signal.

Another feature of the invention is the provision of a frequency detector circuit having a high Q and being resonant at the selected frequency for separating and passing to one circuit branch the selected continuous frequency signal and for applying the random discontinuous mixed frequency variable amplitude signals to another circuit branch, together with means for separately rectifying signals in both of the circuit branches to produce direct current signals of opposite polarity respectively which are differentially combined to produce a signal of only one polarity responding to the selected continuous frequency signals. The non-resonant circuit branch may further include means to provide amplitude gain for the mixed-frequency non-resonant signals to thus be equal to the amplitude gain of the resonant frequency signals in the resonant circuit branch.

Another feature of the invention is the provision of a resonant circuit portion for selecting and applying with resonant amplitude the selected continuous frequency signal to a first circuit branch, there being provided a second circuit branch including a transformer having a transformation factor equal to the Q of the resonant circuit portion and adapted to receive the discontinuous mixed frequency variable amplitude signals which may include signals of resonant frequency, the primary winding of the transformer being interconnected in the resonant circuit and arranged so that signals of resonant frequency in the transformer primary winding are canceled out to pass no signals of resonant frequency through the second circuit branch. The signals of both circuit branches are rectified to produce direct current signals of opposite polarity respectively which may be differentially combined to produce momentarily a direct current signals of one polarity in response to the selected continuous frequency signal.

Further objects, features and advantages of the invention will be apparent with reference to the following specification and drawings in which:

Fig. 1 is a simplified wiring diagram of one form of the invention;

Fig. 2 which includes Figs. 2a through 2d is a family of curves to show the selectivity of the circuits of the invention;

Figure 3:
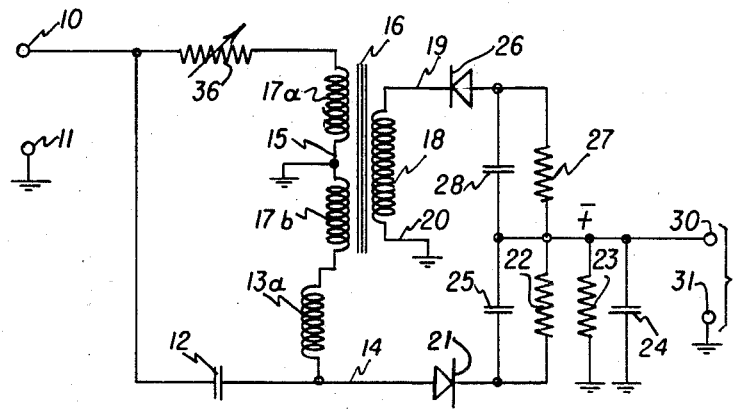
Fig. 3 is a simplified wiring diagram of a second embodiment of the invention.

In practicing the invention there is provided a frequency detector system responsive to a signal of a selected frequency including an acceptance circuit resonant at the selected frequency for providing a high resonant amplitude in response to the selected signal. A rejection circuit is also provided which may be either a tuned or an untuned circuit effectively connected in parallel across the acceptance circuit which may also be loaded by the acceptance circuit at the selected frequency so that the amplitude of the selected frequency in the rejection circuit will be less. The signals in the acceptance and rejection circuits are separately rectified and then differentially combined to produce an output which has a maximum amplitude of one polarity during the occurrence of the selected frequency signal in the event the random signals are of a lesser amplitude for at least a short period when the selected signal is received. This combined output is applied to a polarized relay circuit to produce a desired control operation.

The selectivity of the above system may be improved by controlling the gain of the two circuits to provide signals therein of substantially the same level. This may be accomplished by the use of step-up means such as a transformer in the rejection circuit to increase the voltage therein to correspond to the resonant gain in the acceptance circuit. As stated above, the selectivity may be increased by tuning the rejection circuit to further reject the selected frequency. A balanced arrangement utilizing a transformer with a two-section primary winding may be used to eliminate the selected frequency from the rejection path.

The basic arrangement of the frequency selector system according to the invention is shown in Fig. 1 of the drawings. The electric signals including the signal of selected frequency to which the system responds are applied to input terminals 10 and 11. An acceptance branch 1 is formed by the resonant circuit comprising the series connected condenser 12 and inductance 13, which is connected across the input terminals 10 and 11. The values of the condenser 12 and inductance 13 are selected to tune the resonant circuit to the selected frequency and to provide high Q. When the selected frequency signal is applied to the input terminals 10 and 11, this signal will be stepped up in the resonant circuit to provide a higher amplitude signal across the resonant output terminals 14 and 15. The resonant output terminals 14 and 15 are connected to a first circuit portion or branch of the differential combining circuit.

The transformer 16 is provided with a primary winding 17 connected across the input terminals 10 and 11 and in parallel with the resonant circuit described in the foregoing paragraph. The transformer 16 is connected to a rejection circuit 2 that includes inductance 3, condensers 4 and 5 and resistance 6 tuned to reject signals of the selected frequency but to pass all other signals to the terminals 19 and 20 of the second circuit branch. The transformer may be selected to have a step-up ratio substantially equal to the Q of the resonant circuit 1 at the selected frequency. The resonant circuit branch 1 has a low impedance to the selected frequency signal to load the transformer at such frequency so as to further increase the rejection selectivity of branch 2.

The signals in the first circuit path 1 which are the signals of resonant frequency appearing across the resonant output terminals 14 and 15 are rectified by the rectifier 21 to produce a direct current signal having positive polarity as shown across the resistors 22, 23 and the filter condensers 24 and 25. The signals of non-selected frequency appearing in the second circuit branch across the output terminals 19 and 20 are rectified by the rectifier 26 to produce a direct current signal of the opposite or negative polarity appearing across resistors 27, 23, and filter condensers 28 and 24. In such manner a differential rectifying system is provided to produce a direct current signal of either positive or negative polarity across the resistor 23, depending upon the instantaneous relative amplitudes of the rectified signals in the first and second circuit branches.

It will now be understood that when a signal of the selected frequency is continuously applied to the input terminals 10 and 11, a direct current will flow through the resistor 23 which will tend to make the terminal 30 positive. If at the same time other electric signals of random mixed frequencies and discontinuous amplitudes are applied to input terminals 10 and 11, the direct current through the resistor 23 will tend to make the terminal 30 negative. If, however, at any time during the occurrence of the selected signal it has an amplitude greater than the amplitudes of the signals of different frequencies there will appear a momentary direct current signal of positive polarity across the resistor 23 and at the output terminals 30 and 31. A polarized relay may be connected to the output terminals 30 and 31 to be energized by the positive polarity direct current signal appearing across resistor 23, and such relay may have a holding circuit which will be effective to continue the energization of the relay and operate an associated signalling system to indicate the reception by the frequency selector circuit of the selected continuous frequency signal.

Fig. 2a shows separate curves 32 and 33 of the direct current voltage developed in each branch 1 and 2 respectively of the frequency selector system of Fig. 1. The rejection circuit 2 develops a negative voltage 33 for all frequencies except that at which the circuit is tuned. The acceptance circuit 1 develops little voltage at all frequencies except those close to the frequency to which it is tuned. In Fig. 2b curves 32 and 33 of Fig. 2a have been combined to show the addition of these two voltages in the differential rectifying system. The resultant selectivity of the system at the zero voltage reference level is thus readily apparent.

Fig. 2c shows the performance of the prior art circuits in which only a single tuned circuit is used without any differential comparing through matched circuit paths. Such circuits are usually adjusted so that a signal greater than a certain bias level is required for operation. The dotted curve 34 shows how the selectivity changes as the level of actuating signal is increased, giving a large increase in bandwidth at the bias level. Therefore, such a circuit of the prior art can be falsely operated by high noise levels or by loud signals of frequencies near the intended frequency of circuit operation.

Fig. 2d shows again the performance of the circuits of the present invention and it is important to note that a large increase in signal amplitude level, as shown by the dotted curve 35, does not cause a change in bandwidth at the zero voltage reference level. Therefore, the system of the invention can not be falsely operated by high amplitude signals near the intended frequency of operation.

In Fig. 3 of the drawings a second embodiment of the invention is shown which is essentially similar to that described in Fig. 1. The circuit elements of Fig. 3 which are identical with the circuit elements previously described will be given the same reference numerals and will not be further described in detail. The transformer 16 is provided with a center tapped primary winding having the winding sections 17a and 17b. Primary winding section 17b is connected in series with the inductance 13a and together they form the total inductance of the series resonant acceptance circuit including the condenser 12 and having resonant circuit output terminals 14 and 15. The primary winding sections 17a and 17b are connected to oppose each other, and the variable resistor 36 may be adjusted to exactly balance the current flow of the selected frequency signals through the primary windings 17a and 17b. With the resistor 36 adjusted to balance, the signals of the selected frequency appearing in the primary windings 17a and 17b will effectively cancel each other to produce no signal of selected frequency in the secondary winding 18, thereby providing a rejection action. Thus, the first circuit branch across the resonant output terminals 14 and 15 will contain signals of the selected frequency only, while the second circuit portion branch across the output terminals 19 and 20 of the secondary winding 18 will contain all other mixed frequency signals having frequencies different than the selected signal frequency. The electric signals in both circuit branches are rectified and differentially compared by the same circuit arrangement as described in connection with Fig. 1 to produce a signal of positive polarity across resistor 23 at any time when the continuous selected frequency signal is greater in amplitude than the discontinuous mixed frequency signals.

In the arrangement of Fig. 3, even higher selectivity may be obtained if the transformer 16 is selected to have a transformation factor equal to the Q of the resonant circiut so that signals close to the resonant frequency will appear in both circuit branches with the same amplitudes.

Figure 4:
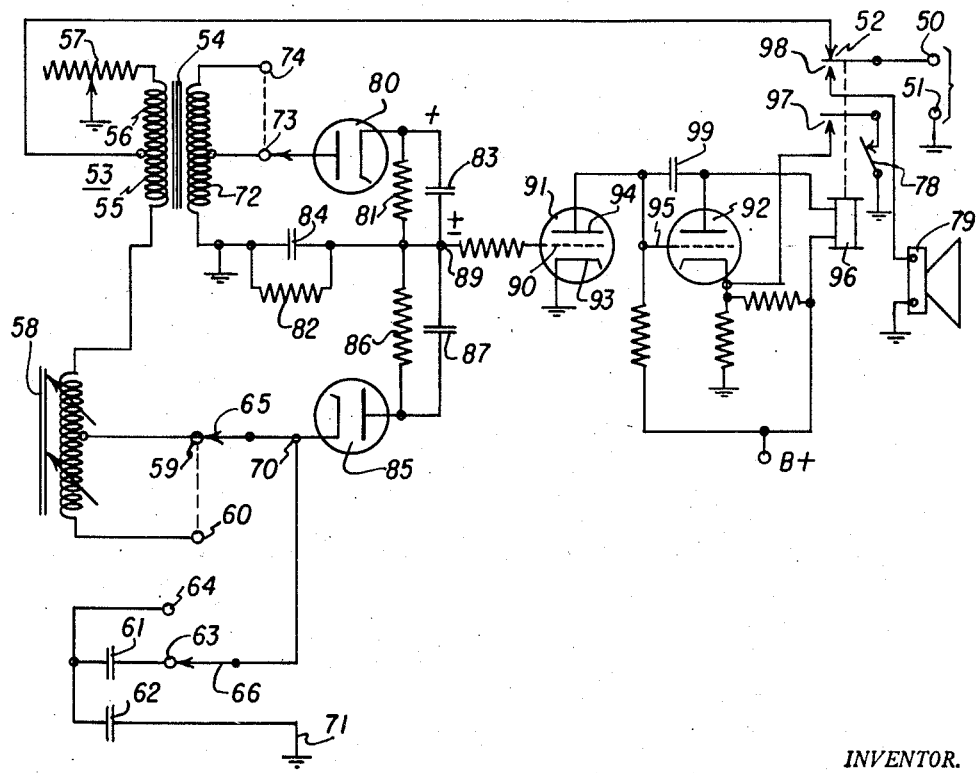
Fig. 4 is a wiring diagram of the practical application of the embodiment of Fig. 3 in a radio selective calling system.

The frequency selecting system of Fig. 3 can be used to operate a selective call radio receiver, as shown in Fig. 4 of the drawings. The input signals including the radom discontinuous mixed frequency variable amplitude signals which may include noise and the audio communication together with the selected continuous frequency signal are applied to the input terminals 50 and 51 and through the normally closed relay contacts 52 to the primary winding 53 of the transformer 54. The primary winding 53 is divided into two winding sections 55 and 56, respectively. Primary winding section 56 is returned to ground through the adjustable resistor 57 and provides a first untuned input circuit. The primary winding 55 is connected in series with the variable inductance 58 having the terminals 59 and 60. Condensers 61 and 62 may be connected in series with inductance 58 or a selected portion thereof by the adjustable contact arms 65 and 66 to cooperate with the terminals 59, 60, 63 and 64, respectively. It should be obvious that by moving the contact arms 65 and 66 to various selected combinations of terminals 59, 60, 63 or 64, four different combinations of inductance and condenser values may be selected to provide a series resonant circuit tuned to four different bands. Various frequencies within the bands can be selected by adjusting the variable inductance 58.

The resonant output terminals 70 and 71 are connected to a first circuit path in which the selected frequency signals are passed by the resonant circuit. The adjustable resistor 57 is adjusted to balance the primary winding sections 55 and 56 such that the signals of selected frequency in windings 55 and 56 oppose each other and cancel to balance out signals of selected frequency in the secondary winding 72 of the transformer 54. The secondary winding 72 is provided with a plurality of taps such as shown at 73 and 74 by means of which the turns ratio of the transformer may be adjusted to provide a voltage step-up equal to that provided by the Q of the resonant circuit.

The signals of mixed frequencies other than the selected frequency as appearing in secondary winding 72 of transformer 54 are rectified by the diode tube 80 to produce a direct current voltage of positive polarity as indicated across resistors 81, 82, and filter condensers 83 and 84. The signals of the selected frequency appearing across the resonant circuit output terminals 70 and 71 are rectified by the diode tube 85 to produce a direct current signal of the opposite or negative polarity as indicated across the resistors 86 and 82 and the filter condensers 87 and 84. The rectified signals of tubes 80 and 85 are thus differentially compared across the resistor 82 to produce a signal of positive polarity corresponding to the passage of signals of mixed frequencies other than the selected frequency and to produce momentarily a signal of negative polarity for the rectified signals of the selected frequency.

The differential recifier signal appearing at the output terminal 89 is applied to the control grid 90 of the triode tube 91 which in turn is connected to a relay tube circuit including the triode tube 92. Cathode 93 of the triode tube 91 is grounded so that the tube 91 is normally conducting and the triode tube 92 is normally non-conducting. When the rectified selected frequency signal has an amplitude greater than the amplitude of the mixed frequency signals, a negative potential will be momentarily applied to the control grid of tube 91 to stop the flow of current in tube 91. The voltage on the plate 94 of triode tube 91 therefore rises to cause the control grid 95 of triode tube 92 to become more positive and cause tube 92 to conduct. The flow of current through triode tube 92 will energize the current sensitive plate circiut relay 96 to close the normally open contacts 97 and 98 and open the normally closed contacts 52. The closing of contacts 97 establishes a holding circuit for the relay 96 by removing the cathode bias of tube 92. This condition will exist after the tone is removed until such time as the normally closed reset switch 78 is momentarily opened. The closing of contacts 98 connects the speaker 79 to the input terminals 50 and 51 to thus be energized by the audio signals or voice communication to be transmitted.

The feedback condenser 99 in the timing circuit is selected to have a value providing a normal operation of .015 seconds after the application of the momentary negative polarity signals to the control grid 90 of triode tube 91. It will thus be seen that the relay 96 is not operated by random mixed frequency signals other than the selected frequency and in fact the rectification of such signals by the diode tube 80 only applies a higher positive potential to the control grid 90 of the tube 91 to make it even more conductive and make the control grid 95 even more negative to insure that the tube 92 remains non-conductive. However, the reception of the selected continuous frequency signal, provided the instantaneous amplitude of the selected frequency signal is greater than the amplitude of any discontinuous frequency signals, will produce a negative voltage at the output terminal 89 and cause the control grid 90 to become more negative to stop current conduction in the tube 91.

Figure 5:
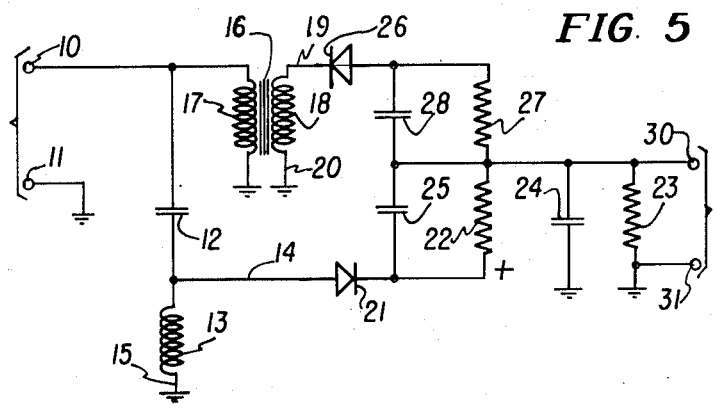
Fig. 5 is a simplified wiring diagram of another embodiment of the invention.

Another embodiment of the invention is shown in Fig. 5 of the drawings. This arrangement is similar to that described in Fig. 1 of the drawings and the circuit elements which are the same have been given the same reference numerals. In the arrangement of Fig. 5, however, the second circuit path connecting the transformer 16 to the output terminals 19 and 20 is not provided with the tuned circuit which in Fig. 1 comprised a bridged T of inductance 3, condensers 4, 5 and resistor 6. The resonant circuit 1 has a very low impedance to the selected frequency signals and loads the primary winding 17 of transformer 16 to reduce the amplitude of signals of the selected frequency induced in the transformer secondary winding 18. The operation of the differential rectifier system is identical with that previously described and serves to produce a direct current signal of one polarity on rectification of the signals of discontinuous mixed frequencies other than the selected frequency and to produce a direct current signal of the opposite polarity for the selected frequency signals. In this circuit the turns ratio of the transformer may also be selected to provide a transformation factor equal to the Q of the resonant circuit.

Figure 6:
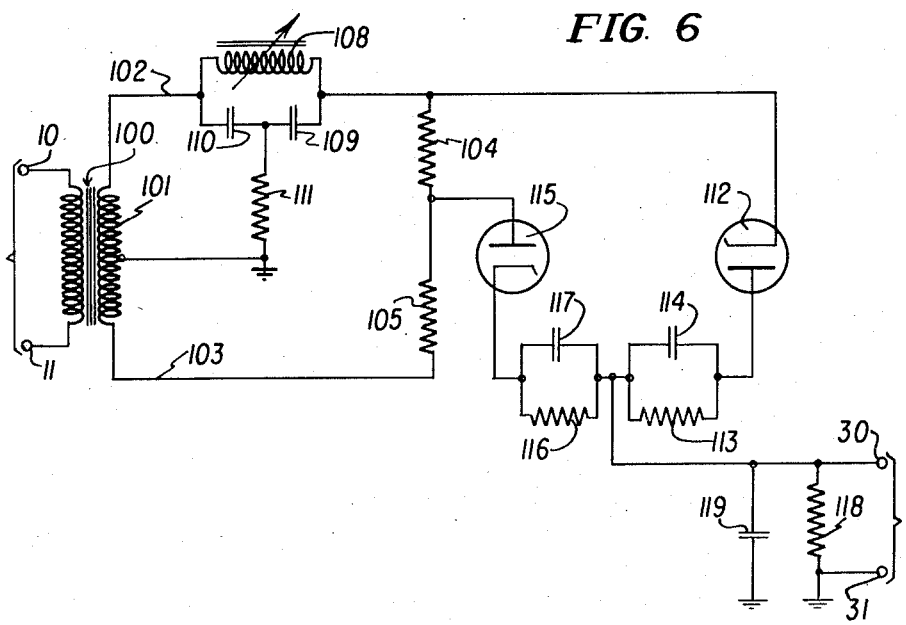
Fig. 6 is a simplified wiring diagram of another embodiment of the invention.

Another embodiment of the invention is shown in Fig. 6. Input terminals 10 and 11 are connected to the primary winding of transformer 100 having a center tapped secondary winding 101. At any given instant, mixed frequency signals will be induced in the secondary winding 101 and lines 102 and 103 of equal amplitude and opposite polarity which signals would normally appear across resistors 104, 105 in a bridge to oppose and cancel each other and produce no signal at the junction point between resistors 104 and 105. The branch circuit 102, however, is provided with a trap circuit including the bridge T inductance 108, condensors 109, 110 and resistance 111 which is tuned to the selected frequency. When a signal of the selected frequency is applied to terminals 10 and 11, the voltages across resistors 104 and 105 are not balanced and a voltage is developed at the junction point between resistors 104 and 105. The diode rectifier tube 112 is connected to rectify the signals not trapped by the trap circuit including inductance 108 and condensers 109 and 110 to develop a direct current signal of one polarity across resistor 113 and condenser 114. The diode rectifier tube 115 is connected to rectify the signals appearing at the junction point between resistors 104 and 105 to develop a direct current of the other polarity across resistor 116 and condenser 117 and the two direct current voltages are differentially compared across resistor 118 and condensor 119 as in the previous embodiment of the invention.

In the foregoing a highly selective single frequency selector system particularly adapted to respond to signals of a selected frequency in the audio range has been described. The frequency selector systems have been disclosed which use only a single resonant circuit to separate the received signals into two paths, one containing the signal of selected frequency only, the other containing signals of other frequencies either including the selected frequency signal in an attenuated form or not at all. According to the basic principle of the invention the separated electric signals of the circuit paths are rectified to produce direct current signals of opposite polarities respectively for each path, and the rectified signals are then differentially compared. With such an arrangement when the calling signal of the selected continuous frequency is received a direct current output signal will have a selected polarity at least momentarily during the time intervals when the amplitude of the selected frequency signal is greater than that of discontinuous random mixed frequency signals. A polarized relay may be energized by the selected polarity signal thus produced to operate a signalling system or otherwise activate a selective call radio receiver.

With such an arrangement wherein the desired signal frequency is separated from the undesired signal frequencies and the separated signals are rectified to produce direct current signals of opposite polarities respectively to be differentially compared for operating a polarized relay, the inadvertent operation of the relay is almost entirely prevented inasmuch as the undesired signals produce a direct current signal of the polarity to further prevent the operation of the polarized relay. If the polarized relay is the type employing a vacuum tube the undesired signals when rectified produce a direct current signal of the polarity to bias the relay tube even further towards or beyond cutoff.

While the embodiments of the invention which have been specifically described all employ a transformer in the non-resonant circuit path to provide a voltage step-up for the mixed frequency non-resonant signals it should be apparent that vacuum tube amplifiers or other arrangements may be used to obtain the desired voltage step-up.

Various modifications may be made within the spirit of the invention and the scope of the appended claims.

I claim:

1. An electric signal frequency selector circuit having input and output terminals and adapted to respond to an input signal of selected continuous frequency in the presence of random mixed discontinuous frequency input signals, said circuit including in combination, a first resonant circuit portion connected to said input terminals and being tuned to the frequency of the signal of selected frequency, a second circuit portion connected to said input terminals in parallel with said first resonant circuit portion and including transformer means, said second portion being adapted to pass the random mixed frequency input electric signals and to attenuate signals of said selected frequency, the resonant impedance of said resonant circuit portion being substantially less than the parallel connected impedance of said second circuit portion, the Q of said resonant circuit portion being of substantially the same value as the transformation factor of said transformer means, means coupled to said resonant circuit portion to recify the selected signal frequency signals passed by said resonant circuit portion to produce a first direct current signal of one polarity, means coupled to said second circuit portion to rectify the mixed frequency signals passed by said second circuit portion to produce a second direct current signal having a polarity opposite to said first direct current signal, and means connected with both of said rectifying means and said output terminals to differentially combine said first direct current signal of one polarity with said direct current signals of the opposite polarity to produce at least momentarily across said output terminals a signal of said one polarity and amplitude responding to said selected continuous frequency signal.

2. In an electric signal frequency detector having input terminals and output terminals at which a control voltage is produced by a signal of selected continuous frequency in the presence of signals of random mixed discontinuous frequencies when applied to the input terminals, the combination including, a series resonant circuit portion connected across said input terminals and having a resonant output tuned to pass the selected frequency signal, transformer means having a tapped primary input winding and a secondary winding, a second circuit portion connecting the tap and one end of said primary winding across said input terminals to form a first untuned primary winding portion for said transformer, the other end of said primary winding being connected with said series resonant circuit portion to form a part of the resonating inductance of said series resonant circuit portion, means to adjust the relative impedances of the circuit portions including the respective primary winding portions for said transformer such that input signals of the selected frequency in said first primary winding portion oppose the input signals of the selected frequency in the second primary winding portion to produce no signal of the selected frequency in said secondary winding of the transformer, means to rectify the signals in said secondary winding to produce a first direct current signal of one polarity, means to rectify the selected frequency signal passed by said resonant circuit portion to produce a second direct current signal of opposite polarity, means to differentially combine said first and second direct current signals, and means to apply said differentially combined direct current signals to said output terminals.

3. In an electric signal frequency detector having input terminals and output terminals of which a control voltage is produced by a signal of selected continuous frequency in the presence of signals of random mixed discontinuous frequencies when applied to the input terminals, the combination including, a high Q series resonant circuit portion connected across said input terminals and having a resonant output tuned to pass the selected frequency signal, a second circuit portion including a transformer having a tapped primary input winding and a secondary output winding, the tap and one end of said primary winding being connected across said input terminals to form a first untuned primary winding portion for said transformer, the other end of said primary winding being connected with said series resonant circuit portion to form a part of the resonating inductance of said resonant circuit portion and forming a second tuned primary winding portion for said transformer at the resonant frequency of said resonant circuit, means to adjust the relative effective impedances of the respective primary winding portions for said transformer such that input signals of the selected frequency in said first primary winding portion oppose the input signals of the selected frequency in the second primary winding portion to produce no signal of the selected frequency in said secondary winding of the transformer, said transformer having a transformation factor equal to the Q of said resonant circuit, means to rectify the signals in said secondary winding to produce a first direct current signal of one polarity, means to rectify the selected frequency signal passed by said resonant circuit portion to produce a second direct current signal of opposite polarity, means to differentially combine said first and second direct current signals, and means to apply said differentially combined direct current signals to said output terminals.

4. An electric signal frequency selector circuit in accordance with claim 1 wherein said second circuit portion includes circuit means tuned to attenuate signals of said selected frequency to thereby increase the differential action of said first and second circuit portions.

5. An electric signal frequency selector circuit in accordance with claim 1 including a transformer having a tapped primary winding providing first and second sections and a secondary winding, and wherein said first resonant circuit portion includes condenser means, inductor means, and said first section of said transformer primary winding connected in series, and said second circuit portion includes said second section of said transformer primary winding and said secondary winding.

References Cited in the file of this patent

UNITED STATES PATENTS

| | | |
|---|---|---|
| 1,313,070 | Cohen | Aug. 12, 1919 |
| 1,910,515 | Ballou | May 23, 1933 |
| 2,402,083 | Reid | June 11, 1946 |
| 2,410,149 | Clark | Oct. 29, 1946 |
| 2,449,412 | Rathenau | Sept. 14, 1948 |
| 2,537,998 | Henquet | Jan. 16, 1951 |